United States Patent
Noh et al.

(10) Patent No.: US 8,446,659 B2
(45) Date of Patent: May 21, 2013

(54) ELECTROCHROMIC DEVICE

(75) Inventors: Chang-Ho Noh, Suwon-si (KR); Seog-Jin Jeon, Yongin-si (KR); Ragini Das Rupasree, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 131 days.

(21) Appl. No.: 12/970,470

(22) Filed: Dec. 16, 2010

(65) Prior Publication Data
US 2011/0292487 A1  Dec. 1, 2011

(30) Foreign Application Priority Data
Jun. 1, 2010 (KR) ........................ 10-2010-0051751

(51) Int. Cl.
*G02F 1/15* (2006.01)
(52) U.S. Cl.
USPC ........................................................ 359/265
(58) Field of Classification Search
USPC .................. 359/265–275; 345/105; 352/582, 352/583, 865
See application file for complete search history.

(56) References Cited

U.S. PATENT DOCUMENTS
7,532,383 B2 *  5/2009  Jang et al. ..................... 359/266

FOREIGN PATENT DOCUMENTS

| | | |
|---|---|---|
| JP | 2000-250074 | 9/2000 |
| JP | 2004-309926 | 11/2004 |
| JP | 2004-317877 | 11/2004 |
| JP | 2006-106669 | 4/2006 |
| JP | 2007-132963 | 5/2007 |
| KR | 1020080099440 A | 11/2008 |

* cited by examiner

*Primary Examiner* — Ricky Mack
*Assistant Examiner* — Tuyen Tra
(74) *Attorney, Agent, or Firm* — Cantor Colburn LLP

(57) ABSTRACT

An electrochromic device includes a first electrode, a second electrode opposing the first electrode, a first electrochromic layer, a second electrochromic layer, and an electrolyte contacted with the first and second electrochromic layers. The first and second electrochromic layers are positioned between the first electrode and the second electrode and includes different electrochromic materials. The first and second electrochromic layers are simultaneously n-type or simultaneously p-type. The electrochromic device may display transparency and various colors in a single pixel without using plural sub-pixels.

20 Claims, 5 Drawing Sheets

ELECTROCHROMIC DEVICE

CROSS-REFERENCE TO RELATED APPLICATION

This application claims priority to Korean Patent Application No. 10-2010-0051751, filed on Jun. 1, 2010, and all the benefits accruing therefrom under 35 U.S.C. §119, the content of which in its entirety is herein incorporated by reference.

BACKGROUND

1. Field

This disclosure relates to an electrochromic device.

2. Description of the Related Art

Electrochromism refers to a phenomenon of reversible color change that depends upon the electric field direction at voltage application. An electrochromic material is a material whose optical characteristics may reversibly change by an oxidation or by a reduction reaction. An electrochromic material may therefore not display a color when an electric field is not applied, while it may display a color when an electric field is applied. Conversely, it may display a color when an electric field is not applied, and the color may disappear when an electric field is applied.

The electrochromic material is used in an electrochromic device where changes in optical transmission characteristics are desired and these changes in the optical transmission characteristics are effected by changes in an applied voltage.

Such electrochromic devices include smart windows and more recently electronic papers. The use of electrochromism in an electronic paper results in a device having light weight and excellent portability.

SUMMARY

Disclosed herein is an electrochromic device capable of increasing resolution and improving color characteristics, thereby realizing high efficiency and high purity color.

According to one embodiment, an electrochromic device includes a first electrode, a second electrode opposing the first electrode, a first electrochromic layer, a second electrochromic layer, and an electrolyte disposed between and contacted with the first electrochromic layer and the second electrochromic layer. The first and second electrochromic layers are positioned between the first electrode and the second electrode and including different electrochromic materials that are either simultaneously n-type or simultaneously p-type.

The first electrochromic layer may include a first electrochromic material that is colorless and displays at least two colors depending on an applied voltage. The second electrochromic layer includes a second electrochromic material that is colorless and displays at least one color depending on the applied voltage.

Each of the first electrochromic material and the second electrochromic material may independently include a metal oxide, a viologen compound, a phthalate compound, a pyridine-based compound, an anthraquinone-based compound, an aminoquinone-based compound, an organometallic compound, a phthalocyanine-based compound, a phenothiazine-based compound, a dye-based compound, a conductive polymer compound or a combination thereof.

The first electrochromic layer and the second electrochromic layer may independently display colors.

At a first applied voltage and a second applied voltage, the first electrochromic material may display one of the at least two colors and the second electrochromic material is colorless. At a third voltage, the first electrochromic material is colorless and the second electrochromic material may display at least one color. At a fourth voltage, the first electrochromic material and the second electrochromic material may simultaneously be colorless.

The electrochromic device may include a plurality of pixels, and each of the plurality of pixels may be colorless or may display a first color, a second color or a third color at different applied voltages. Each of the first, second and third colors may be red, green, or blue.

The electrochromic device may include a plurality of pixels, and each of the plurality of pixels may be colorless or may display a first color, a second color or a third color at different applied voltages. Each of the first, second and third colors may be cyan, magenta, or yellow.

Each of the plurality of pixels may not be divided into a plurality of sub-pixels.

The electrolyte may include the opposite type of material when compared with the material in the first electrochromic layer and in the second electrochromic layer.

The first electrochromic layer may be positioned on one side of the first electrode, the second electrochromic layer may be positioned on one side of the second electrode. The first electrochromic layer and the second electrochromic layer may be opposed to each other with the electrolyte positioned therebetween.

Another embodiment provides an electrochromic device including a plurality of pixels, wherein each of the pixels includes a first electrochromic layer and a second electrochromic layer. The first electrochromic layer comprises a material that displays one of at least two colors while the second electrochromic layer is colorless at a first voltage. At a second voltage, the first electrochromic layer is colorless, and the second electrochromic layer displays at least one color at a third applied voltage.

The first electrochromic layer and the second electrochromic layer may simultaneously include an n-type material or may simultaneously include a p-type material.

In one embodiment, the electrolyte includes a p-type material when the first electrochromic layer and the second electrochromic layer include a n-type material, and the electrolyte includes a n-type material when the first electrochromic layer and the second electrochromic layer include a p-type material. The color displayed by the first electrochromic layer at the first applied voltage and the second applied voltage may include one of red, green and blue colors. The color displayed by the second electrochromic layer at the third applied voltage may include one of red, green, and blue colors.

The color displayed by the first electrochromic layer at the first applied voltage and the second applied voltage may include one of cyan, magenta and yellow colors. The color displayed by the second electrochromic layer at the third applied voltage may include one of cyan, magenta, and yellow colors.

At a fourth applied voltage, the first electrochromic layer and the second electrochromic layer may simultaneously be colorless.

Each of the pixels may not be divided into a plurality of sub-pixels.

DETAILED DESCRIPTION

Figure 1:
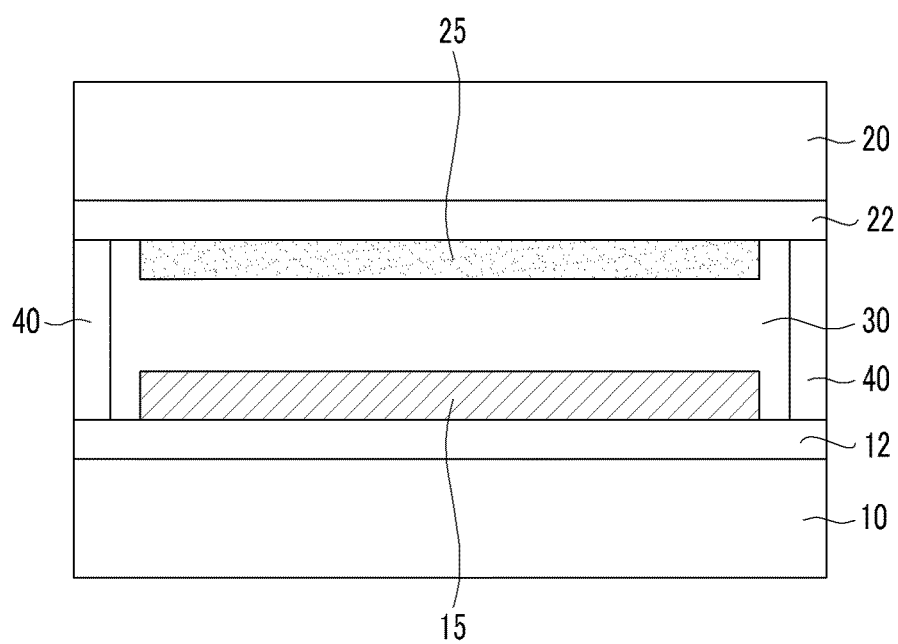
FIG. 1 is a schematic cross-sectional view of an electrochromic device according to one embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. Hereinafter, the electrochromic device according to one embodiment of this disclosure is described referring to FIG. 1.

FIG. 1 is a schematic cross-sectional view of an electrochromic device according to one embodiment.

Referring to FIG. 1, the electrochromic device according to one embodiment includes: a lower substrate 10 and an upper substrate 20 opposedly disposed to the lower substrate 10, and fixed to a spacer 40; a lower electrode 12 and an upper electrode 22 positioned respectively on one side of the lower substrate 10 and the upper substrate 20; an electrolyte 30 filled between the lower electrode 12 and the upper electrode 22; and a lower electrochromic layer 15 and an upper electrochromic layer 25 positioned respectively on one side of the lower electrode 12 and the upper electrode 22, and respectively contacting the electrolyte 30.

The lower substrate 10 and the upper substrate 20 may be formed of an optically transparent glass or a polymer. The polymer may include, for example, at least one selected from copolymers of polyolefins, polyacrylate, polyesters such as polyethylene terephthalate, polybutylene terephthalate, polyethylene naphthalate, polycarbonate, polyarylate, polystyrene, polyetherimide, polyethersulfone, polyimide, or the like, or a combination comprising at least one of the foregoing polymers.

Examples of transparent glasses include silica, alumina, titania, zirconia, or the like, or a combination comprising at least one of the foregoing glasses.

At least one of the lower electrode 12 and the upper electrode 22 may be formed of a transparent conductor, and each of them may include an inorganic conductive material such as indium tin oxide ("ITO"), fluorine tin oxide ("FTO"), antimony doped tin oxide ("ATO"), Indium zinc oxide (IZO) or an organic conductive material such as polyacetylene, polyaniline, polypyrroloe or polythiophene.

The electrolyte 30 promotes an oxidation/reduction reaction in the electrochromic material, and may be a liquid electrolyte or a solid polymer electrolyte. The liquid electrolyte may include, for example, a solution wherein a lithium salt such as LiOH or LiClO$_4$, a potassium salt such as KOH, or sodium salt such as NaOH, or the like, or a combination comprising at least one of the foregoing salts is dissolved in a solvent, but is not limited thereto. The solid electrolyte may include, for example, poly(2-acrylamino-2-methylpropane sulfonic acid), poly(ethylene oxide), or the like, or a combination comprising at least one of the foregoing solid electrolytes, but is not limited thereto. The lower electrochromic layer 15 and the upper electrochromic layer 25 include different electrochromic materials. The electrochromic material is a compound capable of reversible color display depending upon the electric field direction when a voltage is applied. It may display a unique color according to the material.

The lower electrochromic layer 15 and the upper electrochromic layer 25 may both simultaneously include an n-type electrochromic material or may simultaneously include a p-type electrochromic material. In other words, when the lower electrochromic layer 15 contains an n-type electrochromic material, the upper electrochromic layer 25 also contains the same n-type electrochromic material. When the lower electrochromic layer 15 contains an p-type electrochromic material, the upper electrochromic layer 25 also contains the same p-type electrochromic material. The n-type electrochromic material may be a cathodic coloration material that displays a color in a reduced state and becomes transparent in an oxidized state. The p-type electrochromic material may be anodic coloration material that displays a color in an oxidized state and becomes transparent in a reduced state.

When the lower electrochromic layer 15 and the upper electrochromic layer 25 both simultaneously include an n-type electrochromic material or simultaneously include a p-type electrochromic material as described above, the electrolyte 30 may include the opposite type of material to the lower electrochromic layer 15 and the upper electrochromic layer 25. It causes a stable electrochemical reaction. For example, if the lower electrochromic layer 15 and the upper electrochromic layer 25 both simultaneously include an n-type electrochromic material, the electrolyte 30 will include a p-type material, and if the lower electrochromic layer 15 and the upper electrochromic layer 25 both include a p-type electrochromic material, the electrolyte 30 will include an n-type material.

When the lower electrochromic layer 15 and the upper electrochromic layer 25 include the same type of electrochromic material as described above, only one of the lower electrochromic layer 15 or the upper electrochromic layer 25 may display a unique color with an applied voltage. In short, while one electrochromic layer displays a color, the opposing electrochromic layer is colorless (i.e., it displays transparency)

If only one of the lower electrochromic layer 15 or the upper electrochromic layer 25 includes the n-type electrochromic material and the other includes the p-type electrochromic material, the lower electrochromic layer 15 and the upper electrochromic layer 25 may simultaneously display colors to cause color mixing when a voltage is applied to the lower electrode 12 and the upper electrode 22. The result of having the opposing electrochromic layers comprising two different types of electrochromic materials means that only a mixed color of two or more colors will be displayed, and a single basic/primary color (such as red, green, and blue color) is not going to be displayed.

According to this embodiment in which the lower electrochromic layer 15 and the upper electrochromic layer 25 include the same type of electrochromic material (e.g., either of the n-type or the p-type) as described above, the unique color displayed by the lower electrochromic layer 15 or the unique color displayed by the upper electrochromic layer 25 is able to be displayed separately and independently without a color mixing with the other unique color.

For example, one of the lower electrochromic layer 15 and the upper electrochromic layer 25 may include an electrochromic material sequentially being colorless (i.e., displaying transparency) and at least two colors according to the applied voltage and the other may include an electrochromic material sequentially displaying transparency and at least one color according to the applied voltage. Accordingly, the electrochromic device may display transparency and at least three colors according to the applied voltage.

The electrochromic material sequentially displaying transparency and at least two colors may include an n-type metal oxide such as tungsten oxide (WO$_3$), molybdenum oxide (MoO$_3$), titanium oxide (TiO$_2$), or the like, or a combination comprising at least one of the foregoing n-type metal oxides; a p-type metal oxide such as vanadium oxide (V$_2$O$_5$), iridium oxide (IrO$_2$), niobium oxide (Nb$_2$O$_5$), nickel oxide (NiO), or the like, or a combination comprising at least one of the foregoing n-type metal oxides; a viologen compound; a phthalate-based compound such as isophthalate; a pyridine-based compound; an anthraquinone-based compound; an aminoquinone-based compound; a rare earth element-based organic compound; a phthalocyanine-based compound; a ruthenium-based organometallic compound; a Leuco dye-based compound; a phenothiazine-based compound; a polymer compound, or the like, or a combination thereof.

It will be explained referring to FIG. 2 and once again to the FIG. 1.

Figure 2:
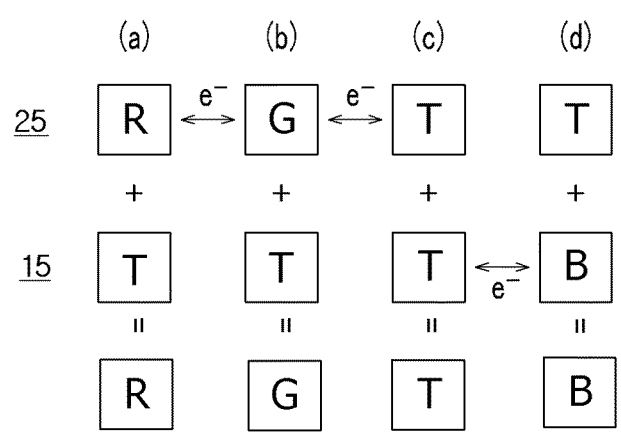
FIG. 2 is a schematic diagram illustrating colors displayed at each pixel according to electrochemical reaction that is dependent upon the applied voltage in the electrochromic device of FIG. 1.

FIG. 2 is a schematic diagram illustrating colors displayed at each pixel by electrochemical reaction according to voltage application in the electrochromic device of FIG. 1.

For better understanding and ease of description, in the FIG. 2, the first row shows a change of color display (depending upon the applied voltage) in the upper electrochromic layer 25, the second row shows a change of color display (depending upon the applied voltage) in the lower electrochromic layer 15, and the third row shows colors displayed by combining the upper electrochromic layer 25 and lower electrochromic layer 15 in the electrochromic device.

In the FIG. 2, an electrochromic material that is colorless when the voltage is not applied, is, for example, reduced to display green ("G") at a voltage of about −1V. It may, for example, be doubly-reduced to display red ("R") at a voltage of about −1.5V.

In order to effect a better understanding of the process, the voltage indicates the magnitude of the voltage for using the upper electrode 22 as a reference electrode, a negative (−) voltage indicates the state where the lower electrode 12 has a lower voltage relative to the upper electrode 22, while a positive (+) voltage indicates a state where the lower electrode 12 has a higher voltage relative to the upper electrode 22.

Referring to FIG. 2, in the case in which a voltage of about 0 to 0.5V is applied (c), electrochromic materials of the lower electrochromic layer 15 and the upper electrochromic layer 25 will simultaneously display transparency (T) without substantially causing an electrochemical reaction. In other words, when the voltages of the lower electrochromic layer and the upper electrochromic layer are substantially equal to one another, the electrochromic device may display transparency (T) without any color display.

Meanwhile, in the case where a voltage of about 1.5V is applied (d), the electrochromic material of the upper electrochromic layer 25 does not change and is colorless (i.e., it displays transparency (T)), while the electrochromic material of the lower electrochromic layer 15 undergoes reduction to display blue ("B"). In this case, the electrochromic device will display a blue (B) color which is a combination of transparency (T) and blue (B).

On the contrary, in those cases where a voltage of about −1.0V is applied (for example, in the FIG. 2-(b)), the electrochromic material of the lower electrochromic layer 15 does not undergo any electrochemical change and is colorless (i.e., it displays transparency (T)), while the electrochromic material of the upper electrochromic layer 25 undergoes reduction to display a green (G) color. In this case, the electrochromic device will combine the transparency (T) of the lower electrochromic layer 15 and the green (G) color of the upper electrochromic layer 25 to display the green (G) color.

In the case where a voltage of about −1.5V is applied (a), the electrochromic material of the lower electrochromic layer 15 does not undergo any electrochemical change and is colorless (i.e., it displays transparency (T)), and the electrochromic material of the upper electrochromic layer 25 is reduced to display red (R). In this case, the electrochromic device will combine the transparency (T) of the lower electrochromic layer 15 with the red (R) of the upper electrochromic layer 25 to display the red (R) color.

Although transparency (T), red (R), green (G), and blue (B) are illustrated in the FIG. 2 and discussed in detail above, the same principles may be applied to an electrochromic device that displays transparency (T), cyan, magenta, and yellow at various applied voltages. Further, other additional colors may also be displayed depending upon the different types of electrochemical reactions in the electrochromic material. In addition, various colors may be combined to display black. For example, if three adjacent pixels respectively display red, green, and blue, the colors displayed in the three pixels may be combined to display black. If a pixel is in the transparent mode, the color white may be displayed by providing the pixel with high reflectance of about 40% or more.

The electrochromic device may thus display black and/or white, as well as display various colors, without the use of a color filter. In conventional electronic color displays, three or more sub-pixels are generally used to display red, green and blue. In the presently described electrochromic device, however, various colors may be displayed at a single pixel by changing the voltage without using any sub-pixels. Therefore, the various displays (i.e. for red (R), green (G), blue (B) and transparency (T)) are possible in a single pixel. The same pixel that produces the colors detailed above (red (R), green (G) and blue (B)) is adapted to provide white color at the transparency (T) display.

As a result of being to display any desired color in a single pixel, the process of color production and/or reproduction is greatly simplified. The loss of light is reduced because of the simplicity of the process. In addition, because any color such as, for example, red, blue or green can be displayed in a single pixel, the resolution is increased by at least 3 times or more, specifically at least 4 times or more over a comparative display that uses 3 pixels to display red, green and blue.

The lower electrochromic layer 15 and the upper electrochromic layer 25 may include the electrochromic materials that are described above and that are further adsorbed on the surface of nano-particles. In this embodiment, the nanoparticles are disposed between a substrate and the electrode. An electrochromic layer is then disposed upon the electrode. A semiconductor material may be used to form the nanoparticles, and it may include, for example, titanium oxide ($TiO_2$), zinc oxide ($ZnO_2$), tungsten oxide ($WO_3$), or a combination thereof. The nano-particles may be of various shapes including sphere, tetrahedron, cylinder, triangle, disk, tripod, tetrapod, cube, box, star, tube, or the like, and the size thereof may be about 1 to about 100 nanometers ("nm"), specifically about 10 to about 75 nm, and more specifically about 15 to about 50 nm.

If a nano-particle adsorbed electrochromic material is used in the electrochromic layers, the surface area is increased and more electrochromic material may be coated on the electrochromic layer to increase efficiency of the electrochromic device.

Alternatively, the lower electrochromic layer 15 and the upper electrochromic layer 25, may include an electrochromic material that is mixed with a polymeric compound. The polymer compound may include, for example, polyvinyl pyrrolidone, polyvinyl butanol, or a combination thereof. In one embodiment, about 50 to about 99 weight percent (wt %) of the electrochromic material and about 1 to about 50 wt % of the polymer compound may be mixed to form one of the electrochromic layers. If the polymer compound is included within the above range, efficiency of the electrochromic device may increase.

In the above embodiment, the electrochromic device is illustratively explained using a transparent display device without a separate reflector, but is not limited thereto. The electrochromic device may be applied to a reflective device equipped with a reflection layer on one side of one of the lower substrate 10 or the upper substrate 20.

The following examples illustrate this disclosure in more detail. However, it is understood that this disclosure is not limited by these examples.

EXAMPLE 1

An indium tin oxide (ITO) electrode is formed on a polymer substrate, a $TiO_2$ layer with an average particle diameter of about 25 nm is formed thereon to a thickness of about 7 micrometers, and then the electrochromic material of the following Chemical Formula 1 is coated thereon. An ITO electrode is formed on another polymer substrate, a $TiO_2$ layer with an average particle diameter of about 25 nm is formed thereon to a thickness of about 7 micrometers, and then the electrochromic material of the following Chemical Formula 2 is coated thereon. Subsequently, the two substrates are disposed so as to oppose each other and are then sealed with a spacer therebetween (as previously described in the FIG. 1), and an electrolyte including about 0.1 moles of $LiClO_4$ and about 0.05 moles of ferrocene is dissolved in gammabutyrolactone and implanted therebetween to manufacture an electrochromic device.

[Chemical Formula 1]

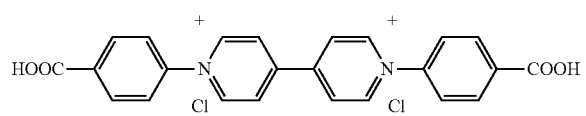

[Chemical Formula 2]

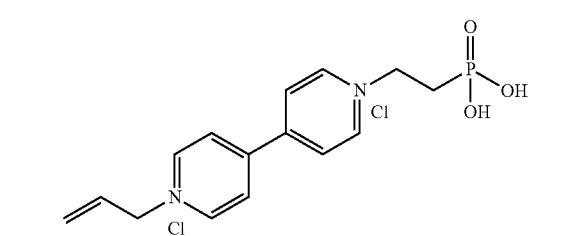

Voltages of about −1.5V, −1.0V, 0V, and 1.5V were applied to the above manufactured electrochromic device, and then color displays according to the applied voltage are confirmed.

The results are explained with reference to FIG. 3 and FIG. 4.

Figure 3:
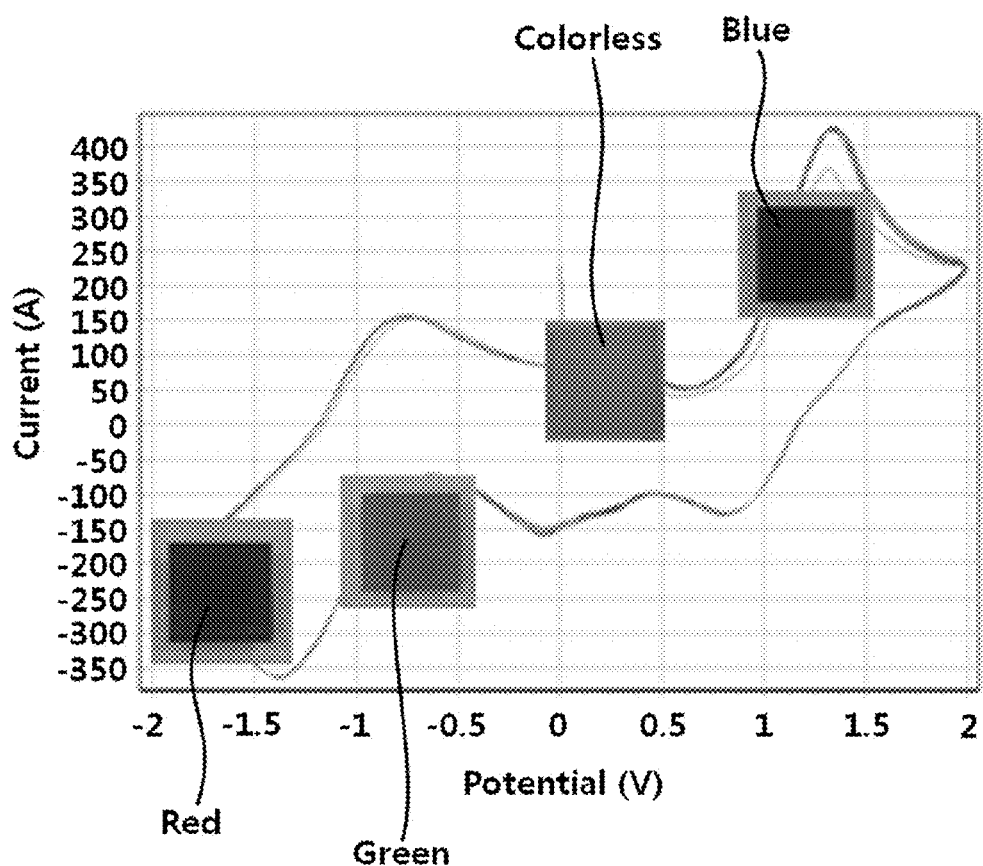
FIG. 3 is a graph showing cyclic voltametry in the electrochromic device according to Example 1 and a photograph showing color change according to voltage.
Figure 4:
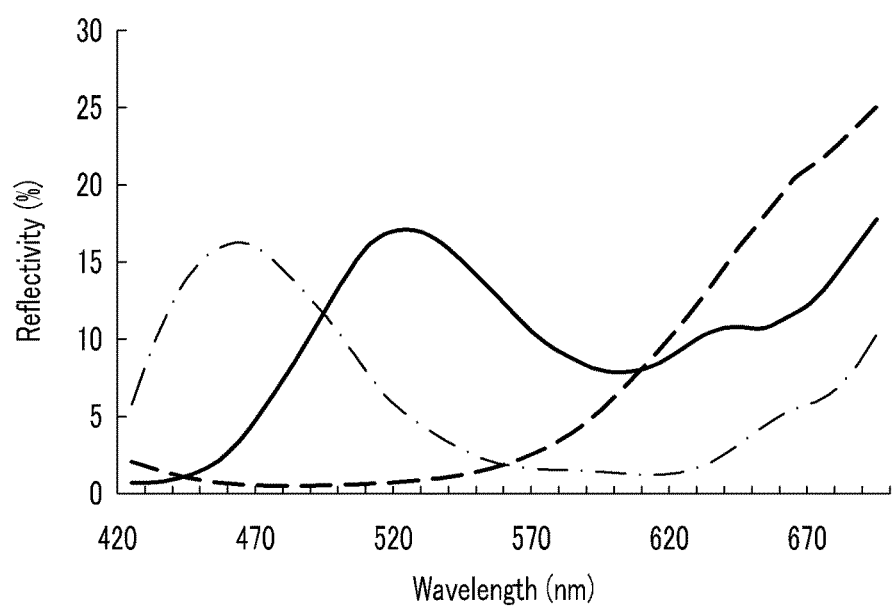
FIG. 4 is a graph showing the results of spectrum measurement at the visible ray region in the electrochromic device according to Example 1.

FIG. 3 is a graph showing cyclic voltametry in the electrochromic device of Example 1 with a photograph showing color change according to the applied voltage, and FIG. 4 is a graph showing spectrums of displayed colors in the electrochromic device of Example 1.

Referring to FIG. 3 and FIG. 4, it can be seen that the electrochromic device displays red, green, and blue depending upon the applied voltage changes. The displayed red, green, and blue colors are in the red wavelength region, the green wavelength region, and the blue wavelength region respectively.

EXAMPLE 2

An electrochromic device is manufactured by substantially the same method as Example 1, except that a compound of the following Chemical Formula 3 is used instead of the compound of Chemical Formula 1 and a compound of the following Chemical Formula 4 is used instead of the compound of Chemical Formula 2.

[Chemical Formula 3]

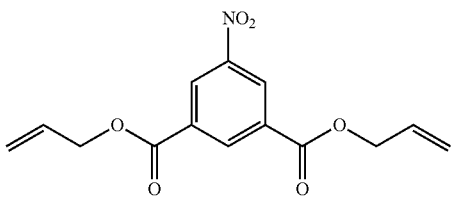

[Chemical Formula 4]

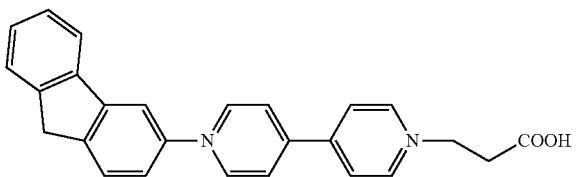

Voltages of about −1.5V, −1.0V, 0V, and 1.5V are applied to the above manufactured electrochromic device, and then color displays according to the applied voltage are confirmed. This is explained referring to FIG. 5.

Figure 5:
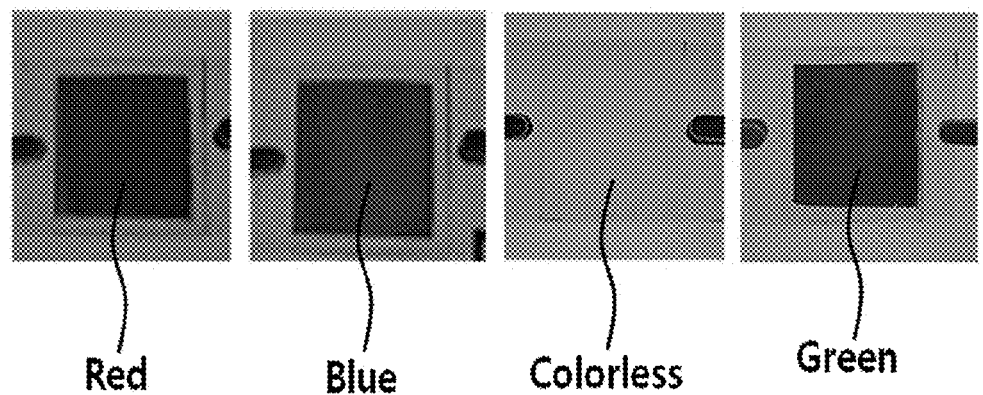
FIG. 5 is a photograph showing color change according to voltage in the electrochromic device according to Example 2.

FIG. 5 is a photograph showing color change according to the applied voltage in the electrochromic device of Example 2. Referring to FIG. 5, it can be seen that red, blue, transparency, and green are sequentially displayed depending upon the applied voltage.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrochromic device comprising:
a first electrode;
a second electrode opposing the first electrode;
a first electrochromic layer and a second electrochromic layer positioned between the first electrode and the second electrode, wherein the first electrochromic layer and the second electrochromic layer include different electrochromic materials, and the different electrochromic materials are either simultaneously n-type or simultaneously p-type; and
an electrolyte disposed between the first electrochromic layer and the second electrochromic layer,
wherein the electrolyte includes the opposite type of material compared with the type of material in the first electrochromic layer and in the second electrochromic layer.

2. The electrochromic device of claim 1, wherein the first electrochromic layer includes a first electrochromic material, wherein the first electrochromic material is colorless and displays at least two different colors depending upon an applied voltage, and
the second electrochromic layer includes a second electrochromic material, wherein the second electrochromic material is colorless and displays at least one color depending upon the applied voltage.

3. The electrochromic device of claim 2, wherein each of the first electrochromic material and the second electrochromic material includes a metal oxide, a viologen compound, a phthalate compound, a pyridine-based compound, an anthraquinone-based compound, an aminoquinone-based compound, a rare earth element-based organometallic compound, a phthalocyanine-based compound, a phenothiazine-based compound, a dye-based compound, a conductive polymer compound, or a combination thereof.

4. The electrochromic device of claim 2, wherein the first electrochromic layer and the second electrochromic layer independently display the color.

5. The electrochromic device of claim 4, wherein at a first applied voltage and at a second applied voltage, the first electrochromic material displays one of the at least two colors, and the second electrochromic material is colorless.

6. The electrochromic device of claim 4, wherein at a third applied voltage, the first electrochromic material is colorless, and the second electrochromic material displays the at least one color.

7. The electrochromic device of claim 4, wherein at a fourth applied voltage, the first electrochromic material and the second electrochromic material are both colorless.

8. The electrochromic device of claim 1, further comprising a plurality of pixels, wherein each of the plurality of pixels displays colorless, red, green, or blue color according to an applied voltage.

9. The electrochromic device of claim 8, wherein the each of the plurality of pixels is not divided into a plurality of sub-pixels.

10. The electrochromic device of claim 1, further comprising a plurality of pixels, wherein each of the plurality of pixels displays colorless, cyan, magenta, or yellow color according to an applied voltage.

11. The electrochromic device of claim 10, wherein the each of the plurality of pixels is not divided into a plurality of sub-pixels.

12. The electrochromic device of claim 1, wherein the electrolyte includes a p-type material when the first electrochromic layer and the second electrochromic layer include a n-type material, and wherein the electrolyte includes a n-type material when the first electrochromic layer and the second electrochromic layer include a p-type material.

13. The electrochromic device of claim 1, wherein
the first electrochromic layer is positioned on one side of the first electrode,
the second electrochromic layer is positioned on one side of the second electrode, the first electrochromic layer and the second electrochromic layer are opposed to each other, and
the electrolyte is disposed between the first electrochromic layer and the second electrochromic layer.

14. An electrochromic device comprising:
a plurality of pixels; and
an electrolyte
wherein each pixel of the plurality of pixels includes a first electrochromic layer and a second electrochromic layer,
wherein at a first applied voltage and a second applied voltage, the first electrochromic material displays at least two colors, and the second electrochromic layer is colorless,
wherein at a third applied voltage, the first electrochromic layer is colorless, and the second electrochromic layer displays a color, and
wherein the electrolyte includes the opposite type of material compared with type of material in the first electrochromic layer and in the second electrochromic layer.

15. The electrochromic device of claim 14, wherein the first electrochromic layer and the second electrochromic layer simultaneously include an n-type material or simultaneously include a p-type material.

16. The electrochromic device of claim 15,
wherein the electrolyte includes a p-type material when the first electrochromic layer and the second electrochromic layer include a n-type material, and
wherein the electrolyte includes a n-type material when the first electrochromic layer and the second electrochromic layer include a p-type material.

17. The electrochromic device of claim 14, wherein the at least two colors displayed by the first electrochromic layer at the first applied voltage and the second applied voltage and the color displayed by the second electrochromic layer at the third voltage include one of red, green, and blue.

18. The electrochromic device of claim 14, wherein the at least two colors displayed by the first electrochromic layer at the first applied voltage and the second applied voltage and the color displayed by the second electrochromic layer at the third applied voltage include one of cyan, magenta, and yellow.

19. The electrochromic device of claim 14, wherein at a fourth applied voltage, the first electrochromic layer and the second electrochromic layer are simultaneously colorless.

20. The electrochromic device of claim 14, wherein each of the pixels is not divided into a plurality of sub-pixels.

* * * * *